(12) United States Patent
Falahati et al.

(10) Patent No.: US 11,832,286 B2
(45) Date of Patent: *Nov. 28, 2023

(54) SCHEDULING REQUEST RESOURCE CONFIGURATION

(71) Applicant: Telefonaktiebolaget LM Ericsson (publ), Stockholm (SE)

(72) Inventors: Sorour Falahati, Stockholm (SE); Robert Baldemair, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/586,253

(22) Filed: Sep. 27, 2019

(65) Prior Publication Data
US 2020/0029346 A1    Jan. 23, 2020

Related U.S. Application Data

(63) Continuation of application No. 16/398,655, filed on Apr. 30, 2019, now Pat. No. 10,470,203, which is a
(Continued)

(51) Int. Cl.
*H04W 72/12* (2009.01)
*H04W 72/02* (2009.01)
(Continued)

(52) U.S. Cl.
CPC ..... *H04W 72/535* (2023.01); *H04W 72/0446* (2013.01); *H04W 72/1263* (2013.01);
(Continued)

(58) Field of Classification Search
CPC ............. H04W 76/27; H04W 72/1263; H04W 72/1257; H04W 72/1284; H04W 72/1278;
(Continued)

(56) References Cited

U.S. PATENT DOCUMENTS

| 2011/0211326 A1 | 9/2011 | Drouard et al. |
| 2013/0259056 A1 | 10/2013 | Kotrabasappa et al. |

(Continued)

FOREIGN PATENT DOCUMENTS

| CN | 109152033 | * | 2/2017 |
| KR | 20170063616 A | | 6/2017 |

(Continued)

OTHER PUBLICATIONS

International Search Report and Written Opinion dated Sep. 17, 2018 for International Application No. PCT/SE2018/050027 filed Jan. 12, 2018 consisting of 15-pages.

(Continued)

*Primary Examiner* — Phong La
(74) *Attorney, Agent, or Firm* — Christopher & Weisberg, P.A.

(57) ABSTRACT

There is disclosed a method of operating a user equipment in a radio access network. The user equipment is configured with a reference time resource available, in one or more slots, for transmission of a scheduling request by the user equipment, the reference time resource includes a reference symbol R, wherein each of the one or more slots has a slot duration that is based on a number N of symbols in the slot. The user equipment further is configured with a requesting periodicity P indicating a periodicity with a time period shorter than the slot duration. The method includes transmitting a scheduling request message at a request transmission symbol T which is based on the reference symbol R and the periodicity P. The disclosure also pertains to related methods and devices.

22 Claims, 3 Drawing Sheets

Related U.S. Application Data continuation of application No. PCT/SE2018/050027, filed on Jan. 12, 2018.

(51) Int. Cl.

| | |
|---|---|
| *H04W 88/08* | (2009.01) |
| *H04W 72/50* | (2023.01) |
| *H04W 76/27* | (2018.01) |
| *H04W 72/0446* | (2023.01) |
| *H04W 72/1263* | (2023.01) |
| *H04W 88/02* | (2009.01) |
| *H04W 72/20* | (2023.01) |
| *H04W 72/21* | (2023.01) |
| *H04W 72/51* | (2023.01) |

(52) U.S. Cl.
CPC .......... *H04W 72/20* (2023.01); *H04W 76/27* (2018.02); *H04W 88/021* (2013.01); *H04W 88/08* (2013.01); *H04W 72/21* (2023.01); *H04W 72/51* (2023.01)

(58) Field of Classification Search
CPC ............. H04W 72/12; H04W 72/1205; H04W 72/1226; H04W 72/1242; H04W 72/1247; H04W 72/0406; H04W 72/0446; H04W 72/048; H04W 72/044; H04W 72/0466; H04W 72/06; H04W 72/04; H04W 72/04093; H04W 88/021
See application file for complete search history.

(56) References Cited

U.S. PATENT DOCUMENTS

| | | | |
|---|---|---|---|
| 2013/0343318 A1 | 12/2013 | Gruet et al. | |
| 2016/0095104 A1 | 3/2016 | Chen et al. | |
| 2016/0105905 A1 | 4/2016 | Vajapeyam et al. | |
| 2017/0251460 A1* | 8/2017 | Agiwal | H04W 72/0406 |
| 2017/0311276 A1* | 10/2017 | Tsai | H04L 27/2602 |
| 2018/0020441 A1* | 1/2018 | Lo | H04W 72/044 |
| 2018/0123654 A1* | 5/2018 | Park | H04B 7/0626 |
| 2018/0124815 A1* | 5/2018 | Papasakellariou | H04W 72/1268 |
| 2018/0192384 A1* | 7/2018 | Chou | H04W 74/0833 |
| 2018/0220450 A1* | 8/2018 | Aiba | H04W 72/0446 |
| 2018/0262313 A1* | 9/2018 | Nam | H04L 5/005 |
| 2018/0279380 A1* | 9/2018 | Jung | H04W 74/0833 |
| 2018/0288746 A1 | 10/2018 | Zhang et al. | |
| 2018/0310257 A1 | 10/2018 | Papasakellariou | |
| 2019/0029046 A1* | 1/2019 | Li | H04L 1/0003 |
| 2019/0045529 A1* | 2/2019 | Xiong | H04L 5/0048 |
| 2019/0053211 A1 | 2/2019 | Ying et al. | |
| 2019/0109700 A1 | 4/2019 | Liu et al. | |
| 2019/0174517 A1 | 6/2019 | Wang et al. | |
| 2019/0190582 A1 | 6/2019 | Guo et al. | |
| 2019/0208541 A1 | 7/2019 | Lee et al. | |
| 2019/0215717 A1 | 7/2019 | Lee et al. | |
| 2019/0246416 A1* | 8/2019 | Park | H04W 72/20 |
| 2019/0254077 A1* | 8/2019 | Sahlin | H04L 5/0037 |
| 2019/0312622 A1* | 10/2019 | Fu | H04L 1/0027 |
| 2019/0327764 A1* | 10/2019 | Yoo | H04L 1/18 |
| 2019/0350010 A1* | 11/2019 | Guo | H04W 74/004 |
| 2019/0387441 A1* | 12/2019 | Koskela | H04W 36/30 |
| 2020/0036430 A1* | 1/2020 | Kim | H04B 7/088 |
| 2020/0037297 A1* | 1/2020 | Pan | H04W 16/28 |
| 2020/0162289 A1* | 5/2020 | Ahn | H04L 5/0053 |
| 2020/0178338 A1* | 6/2020 | Ahn | H04W 24/10 |
| 2020/0275431 A1* | 8/2020 | Bae | H04L 5/00 |
| 2020/0329466 A1* | 10/2020 | Yoo | H04L 5/0053 |
| 2020/0337002 A1* | 10/2020 | Ko | H04L 5/0048 |
| 2021/0211343 A1* | 7/2021 | Baldemair | H04W 72/1263 |

FOREIGN PATENT DOCUMENTS

| | | |
|---|---|---|
| KR | 20170070040 A | 6/2017 |
| RU | 2015137778 A | 12/2013 |
| WO | 2012119964 A | 9/2012 |
| WO | 2016048595 A1 | 3/2016 |
| WO | 2017014802 A1 | 1/2017 |

OTHER PUBLICATIONS

3GPP TSG RAN WG1 Meeting 90bis R1-1717396; Title: UL data transmission procedures in NR; Agenda Item: 7.3.3.4; Source: Intel Corporation; Document for: Discussion and Decision; Location and Date: Prague, Czech Republic, Oct. 9-13, 2017, consisting of 12-pages.

3GPP TSG RAN WG1 Meeting #90bis R1-1718647; Title: On UL Data Transmission Procedure; Agenda Item: 7.3.3.4; Source: Ericsson; Document for: Discussion and Decision; Location and Date: Prague, Czech Republic, Oct. 9-13, 2017, consisting of 10-pages.

Notice of Preliminary Rejection, dated Dec. 9, 2019 and English language translation for Korean Patent Application No. 10-2019-7033406, consisting of 8-pages.

R1-1719932—LG Electronics, "Remaining issues on UL data transmission procedure," 3GPP TSG RAN WG1 Meeting 91, (3GPP server publication date: Nov. 18, 2017); consisting of 15-pages.

R1-1718647—Ericsson, "On UL Data Transmission Procedure," 3GPP TSG RAN1 WG1 #90bis, (3GPP server publication date: Oct. 3, 2017); consisting of 9-pages.

EPO Communication dated Sep. 20, 2021 for Patent Application No. 18701607.6, consisting of 8-pages.

3GPP TSG RAN WG1 Meeting 91 R1-1720097; Title: Remaining details of UL data transmission procedures in NR; Agenda Item: 7.3.3.4; Source: Intel Corporation; Document for: Discussion and Decision; Date and Location: Nov.-Dec. 1, 2017, Reno, USA, consisting of 10-pages.

3GPP TS 38.331 V15.0.0 3rd Generation Partnership Project; Technical Specification Group Radio Access Network NR; Radio Resource Control (RRC) protocol specification (Release 15); Dec. 2017, consisting of 188 pages.

3GPP TS 38.213 V15.0.0 3rd Generation Partnership Project; Technical Specification Group Radio Access Network; NR; Physical layer procedures for control (Release 15); Dec. 2017, consisting of 56 pages.

3GPP TSG RAN WG1 Meeting 91 R1-1719932; Title: Remaining issues on UL data transmission procedure; Agenda Item: 7.3.3.4; Source: LG Electronics; Document for: Discussion and decision; Location and Date: Reno, USA, Nov. 27-Dec. 1, 2017, consisting of 15-pages.

3GPP TSG RAN WG1 Meeting 91 R1-1720097; Title: Remaining details of UL data transmission procedures in NR; Agenda Item: 7.3.3.4; Source: Intel Corporation; Document for: Discussion and Decision; Location and Date: Reno, USA, Nov. 27-Dec. 1, 2017, consisting of 10-pages.

Petition for Inter Partes Review of U.S. Pat. No. 10,470,203 filed Feb. 26, 2021; *Samsung Electronics Co., Ltd.*, v. *Telefonaktiebolaget LM Ericsson*; Case IPR2021-00588, consisting of 67 pages.

Declaration of Dr. Robed Akl, D.Sc., for Inter Partes Review of U.S. Pat. No. 10,470,203 filed Feb. 26, 2021; *Samsung Electronics Co., Ltd.*, v. *Telefonaktiebolaget LM Ericsson*; Case PR2021-00588, consisting of 143 pages.

Dismissal Prior to Institution of Trial dated Aug. 3, 2021; *Samsung Electronics Co., Ltd.*, v. *Telefonaktiebolaget LM Ericsson*; consisting of 13 pages.

Russian Office Action and Machine Translation dated Mar. 25, 2021 for Application No. 2020126864, consisting of 16 pages.

Korean Notice of Allowance and English Translation dated Dec. 18, 2020 for Application No. 10-2019-7033406, consisting of 5-pages.

3GPP TSG RAN WG1 Meeting 90bis R1-1717396; Title:UL data transmission procedures in NR; Source: Intel Corporation; Agenda Item: 7.3.3.4; Document for: Discussion and Decision; Date and Location: Oct. 9-13, 2017, Prague, Czech Republic, consisting of 12-pages.

(56) References Cited

OTHER PUBLICATIONS

Japanese Notice of Reasons for Rejection and English Summary dated Dec. 15, 2020 for Patent Application No. 2019-562309, consisting of 8-pages.

3GPP TSG RAN WG1 Meeting #90bis R1-1719195; Title: Proposals for SR and UL GF configuration; Agenda Item: 7.3.3.4; Source: NTT Docomo; Date and Location: Oct. 9-13, 2017, Prague, Czech Republic, consisting of 4-pages.

3GPP TSG RAN WG1 Meeting 90bis R1-1717649; Title: Short PUCCH for UCI of more than 2 Bits; Agenda Item: 7.3.2.1.2; Source: Samsung; Document for: Discussion and Decision; Date and Location: Oct. 9-13, 2017, Prague, CZ 9, consisting of 4-pages.

3GPP TSG RAN WG1 Meeting 90bis R1-1717396; Title: UL data transmission procedures in NR; Agenda Item: 7.3.3.4; Source: Intel Corporation; Document for: Discussion and Decision; Date and Location: Oct. 9-13, 2017, Prague, Czech Republic, consisting of 13-pages.

Petition for Inter Partes Review of U.S. Pat. No. 10,470,203 filed Jan. 21, 2022; *Apple Inc.*, v. *Telefonaktiebolaget LM Ericsson*; Case IPR2022-00340, consisting of 69 pages.

Declaration of Jonathan Wells, Ph.D., dated Jan. 20, 2022 for Inter Partes Review of U.S. Pat. No. 10,470,203 filed Jan. 21, 2022; *Apple, Inc.*, v. *Telefonaktiebolaget LM Ericsson*; Case IPR2022-00340, consisting of 133 pages.

Preliminary Response dated May 23, 2022 in Case IPR2022-00340; *Apple Inc.*, v. *Telefonaktiebolaget LM Ericsson*; consisting of 53 pages.

Decision Denying Institution of Inter Partes Review dated Aug. 18, 2022; *Apple Inc.*, v. *Telefonaktiebolaget LM Ericsson*; Case IPR2022-00340, consisting of 18 pages.

Chinese Office Action and English summary dated Dec. 30, 2022 for Application No. 201880086111.5, consisting of 10 pages.

Mexican Office Action and English Summary dated Aug. 2, 2023 for Application No. MX/a/2020/007417, consisting of 12 pages.

* cited by examiner

SCHEDULING REQUEST RESOURCE CONFIGURATION

CROSS-REFERENCE TO RELATED APPLICATIONS

This application is a continuation of U.S. application Ser. No. 16/398,655 filed on Apr. 30, 2019, which is a continuation of International Application No. PCT/SE2018/050027, filed Jan. 12, 2018, the entireties of both of which are incorporated herein by reference.

TECHNICAL FIELD

This disclosure pertains to wireless or telecommunication communication technology, in particular to radio access technology, e.g. for mobile communication.

BACKGROUND

Currently, radio telecommunication technology of $5^{th}$ Generation is being developed, with the goal to serve a large variety of use cases. Thus, the development aims at providing systems with a high level of flexibility, which can lead to undesirable levels of (control) signaling overhead. One type of control signaling is related to scheduling request, e.g. if a user equipment (UE) requests resources for transmission. The request itself has to be sent on resources, which have to be configured or otherwise indicated or reserved. In particular for low-latency applications, or other application requiring a high density of resources available for such requests, the signaling overhead can be significant.

SUMMARY

It is an object of this disclosure to provide approaches allowing efficient control signaling, in particular for handling scheduling requests, e.g. transmission from a user equipment (UE) to a network (e.g., a network node) indicating that the UE desires resources for uplink transmission. The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution.

There is generally disclosed a method of operating a user equipment (or, more generally, a first radio node) in a radio access network. The user equipment (or first radio node) is configured with a reference time resource. The reference time resource is available in one or more slots for transmission of a scheduling request by the user equipment. Moreover, the reference time resource comprises a reference symbol R, wherein each of the one or more slots has a slot duration that is based on a number N of symbols in the slot. The user equipment or first radio node further is configured with a requesting periodicity P indicating a periodicity with a time period shorter than the slot duration. The method comprises transmitting a scheduling request message at a request transmission symbol T which is based on the reference symbol R and the periodicity P.

There is also considered a user equipment for a radio access network. The user equipment is configured with a reference time resource. The reference time resource is available, in one or more slots, for transmission of a scheduling request by the user equipment. The reference time resource comprises a reference symbol R, wherein each of the one or more slots has a slot duration that is based on a number N of symbols in the slot. The user equipment (or first radio node) further is configured with a requesting periodicity P, which indicates a periodicity with a time period shorter than the slot duration. The user equipment (or first radio node) is adapted and/or configured for transmitting a scheduling request message at a request transmission symbol T which is based on the reference symbol R and the periodicity P. The user equipment or first radio node may comprise, and/or be adapted for utilizing, processing circuitry and/or radio circuitry, in particular a transmitter and/or receiver and/or transceiver, for transmitting and/or being configured and/or determining the request transmission symbol T. Alternatively, or additionally, the user equipment or first radio node may comprise (e.g., have stored in memory), a corresponding transmitting module and/or configuring module and/or determining module.

A method of operating a radio node (or a network node arrangement) in a radio access network is described. The method comprises configuring a user equipment or first radio node with a reference time resource. The reference time resource is available, in one or more slots, for transmission of a scheduling request by the user equipment or first radio node. The reference time resource further comprises a reference symbol R, wherein each of the one or more slots has a slot duration that is based on a number N of symbols in the slot. The user equipment or first radio node also is configured (e.g., by the network, in particular the radio node or node arrangement) with a requesting periodicity P indicating a periodicity with a time period shorter than the slot duration. The method comprises receiving a scheduling request message (e.g., from the user equipment or first radio node) at a reception symbol RC which is based on the reference symbol R and the periodicity P. The method may also comprise scheduling the user equipment or first radio node based on the received scheduling request message, e.g. for transmission on a data channel like a physical channel and/or shared channel, in particular a PUSCH or PSSCH.

There is also proposed a radio node (or a network node arrangement) for a radio access network. The radio node (or network node arrangement) is adapted and/or configured for configuring a user equipment or first radio node with a reference time resource. The reference time resource is available, in one or more slots, for transmission of a scheduling request by the user equipment or first radio node. The reference time resource comprises a reference symbol R, wherein each of the one or more slots has a slot duration that is based on a number N of symbols in the slot. The user equipment or first radio node is also configured (e.g., by the network, in particular the radio node or node arrangement) with a requesting periodicity P indicating a periodicity with a time period shorter than the slot duration. Moreover, the radio node (or network node arrangement) is adapted for receiving a scheduling request message (e.g., from the user equipment or first radio node) at a request reception symbol RC which is based on the reference symbol R and the periodicity P. The radio node (or network node arrangement) may be adapted or configured for scheduling the user equipment or first radio node based on the received scheduling request message, e.g. for transmission on a data channel like a physical channel and/or shared channel, in particular a PUSCH or PSSCH. The radio node (or network node arrangement) may comprise, and/or be adapted for utilizing, processing circuitry and/or radio circuitry, in particular a transmitter and/or receiver and/or transceiver, for configuring and/or receiving and/or scheduling. Alternatively, or additionally, the radio node (or network node arrangement) may comprise a corresponding configuring module and/or receiving module and/or scheduling module.

A radio node, in particular the first radio node, may be a user equipment or a network node. In some cases, the first radio node is a user equipment and/or the radio node is a network node. However, in some variants, e.g. a sidelink scenario, the radio node may be a user equipment. In other variants, the first radio node may be a network node, e.g. in a relay and/or backhaul scenario.

The reference time resource may be associated to a time/frequency resource, e.g. a resource pool or resource region. It may be considered that the reference time resource comprises or consists of one symbol (namely, the reference symbol R), or one or more additional symbols, which may be consecutive in time. The duration (length in time) of the reference time resource may be shorter than the slot duration, and/or may comprise MR symbols in time. MR may be equal to N, or shorter. In some variants, MR may be 1, or 2, or 3, or 4 to 14. The reference symbol may indicate the start and/or a reference and/or duration in time of the reference time resource, e.g. in number of symbols.

Configuring the reference time resource may comprise configuring, e.g. indicating, to the first radio node or user equipment to determine one or more available symbols (available for transmission of a scheduling request) based on the periodicity and the reference symbol. The corresponding behavior may be switched on or off via a configuration. This configuring may be with the same message that configures the reference time resource and/or reference symbol, or a different message.

N may in some variants be 14, however, other variants may be considered. The symbols in a slot may be numbered with consecutive integers, e.g. from 0 to N−1, in particular from 0 to 13.

The periodicity P may correspond to a time interval shorter than the slot duration, in particular equal to or smaller than half the slot duration (N/2). In some cases, P may correspond to 2 or 7 symbols, or a number of symbols in between. Generally, the periodicity may indicate a periodicity of available resources for transmission of scheduling requests. The reference symbol may be seen as an anchoring symbol for a pattern defined by the periodicity, wherein the periodicity is on a time scale below a slot duration. Accordingly, multiple available symbols (respectively, resources) may be provided or configured.

The request transmission symbol may be associated to a corresponding resource. Depending on the slot duration and the periodicity, there may be at least two, or more than two, possible or available request transmission symbols. The reference symbol R may be considered as request transmission symbol. Generally, the request transmission symbol may be determined and/or selected, e.g. by the user equipment or first radio node, from the symbols of a slot that can be addressed based on the periodicity P and the reference symbol R. In particular, a set may comprise the symbols of a slot numbered $R+I \times P$, with I a positive or negative integer or zero, such that the symbol is still in the slot. In some variants, the values for I may be positive to cross over to one or more consecutive slots (of the more than one slots for which R is available). In this case, for each slot border crossed, the symbol number may be reduced by the total number of symbols N in a slot. Alternatively, for each slot, the available symbols can be as given with I limited to represent symbol numbers in the slot only. If the reference symbol is available for more than one slot, the slots may be consecutive in time, or in some cases interrupted by slots without R being available for scheduling requests, e.g. with a given slot periodicity. For more than one slot, the reference symbol R may have the same number, such that in each of the slots, at least the same-numbered reference symbol is available.

The scheduling request, respectively corresponding signaling, may pertain to one carrier aggregation, and/or carrier, and/or bandwidth part, and/or one channel (e.g., physical channel like PUSCH or PSSCH, or logical channel) or channel group (in particular logical channel group) or bearer (or bearer group). The scheduling request may be transmitted on a specific channel, e.g. a control channel, which may be a physical control channel, e.g. a PUCCH or PSCCH, and/or which may be a contention-free channel. The channel may be associated to the carrier aggregation and/or carrier, and/or bandwidth part, and/or one channel or channel group or bearer the scheduling request pertains to. A scheduling request may be considered to pertain to one of such structures if it indicates that resources are requested for transmission on the structure.

Generally, transmitting (or receiving) a scheduling request message may comprise determining a set of symbols available for transmitting the request, based on the reference symbol R and the periodicity P. Such determining may be for each slot individually, or for a set of slots, e.g. with selecting I accordingly, or another method.

The reference symbol R may be configured for a starting slot, e.g. based on a slot offset. The starting slot may be the first slot for which the reference symbol R is available. The starting slot may be predetermined (e.g., based on processing time and/or a standard definition) and/or may be configured or configurable, e.g. with higher layer signaling, e.g. semi-static signaling and/or RRC signaling. The starting slot may be configured as slot offset. In some variants, the reference symbol R may be the first (in time) symbol available for transmission of a scheduling request.

A scheduling request may indicate that a user equipment or first radio node requests resources for transmission, e.g. if it has data to transmit in a buffer. In some variants, the scheduling request may comprise buffer status information, which may be indicative of the size of data and/or size range of data of one or more buffers. A buffer may correspond to a channel, or a group of channels. A scheduling request may be carried by a scheduling request message.

Generally, a symbol available for scheduling requests may indicate or represent a range of symbols in which it is included, over which a scheduling request may be transmitted. Two symbols available for transmission of a scheduling request in a slot may be separated by at least one symbol of the slot, such that the available symbols may be non-consecutive or interrupted. However, a range of symbols over which the scheduling request is transmitted at the request transmission symbol T may be long enough to reach to one or more other symbols available. It may be considered that for such available symbols, no scheduling request transmission is started, but an earlier transmission may continue. A symbol available for transmission may indicate a symbol in which the transmission may be started.

It may be considered that in general, to each available symbol there is indicated and/or configured a time/frequency resource and/or channel and/or transmission format (e.g., a message format), e.g. semi-statically, e.g. with RRC signaling. Such configuring may be with the message that configures the reference symbol, or with a different message. A time/frequency resource may generally comprise one or more resource elements, e.g. one or more symbols and one or more associated subcarriers or physical resource blocks.

The scheduling request message may be transmitted over one or more than one symbol, and/or the reference time resource comprises one or more than one symbols. The scheduling request message may in particular be a PUCCH or PSSCH message, e.g. a format 0 or format 1 (or derivates thereof) message, and/or be transmitted over 1 symbol (e.g., format 0), or more than one symbol (e.g., 4 to 14, which may be configurable or configured, e.g. with the configuration of the reference time resource).

In some variants, the scheduling request message may be a physical control channel message, e.g. a PUCCH or PSSCH message.

The periodicity P and/or the reference symbol R may be semi-statically configured, and/or the periodicity P and/or the reference symbol R may be configured utilizing Radio Resource Control signaling.

It may be considered that the periodicity P and the reference symbol R are configured with the same message, or with different messages. Different messages may be from different radio nodes, or from the same radio node.

The request transmission symbol T may be earlier in a slot than the reference symbol R of the same slot. This may for example be for the starting slot, such that a scheduling request may be transmitted earlier than the first configured symbol R.

It may be considered that the user equipment or first radio node is configured (e.g., by the network, in particular the radio node) with a slot offset, the slot offset indicating a starting slot from which the reference time resource is available. Accordingly, position of the starting slot may be adapted to operation conditions and/or UE capabilities (which may, for example be signaled to the network, e.g. the radio node).

The scheduling request message may comprise or represent 1 or 2 bits, which for example may be payload or information bits. In some variants, the message may comprise error coding bits, and/or repeat the payload or information bit/s, e.g. if the message is transmitted over more than one symbol.

Generally, 1 bit (or more than one bit) of the scheduling request message may indicate whether the user equipment requests resources for transmission by the user equipment.

There is also considered a program product comprising instructions adapted for causing processing circuitry to control and/or perform a method as described herein.

Moreover, there is described a carrier medium arrangement carrying and/or storing a program product as described herein.

A corresponding information system comprising, and/or connected or connectable to a radio node as described herein may be considered.

In general, a symbol available for transmission of a scheduling request may represent a possible or available starting symbol of such a transmission. Accordingly, a transmission of a scheduling request transmitted at a request transmission symbol may start at the request transmission symbol.

A request reception symbol may be based on the request transmission symbol and a signaling time. Receiving the scheduling request message may comprise, and/or be based on, determining the request reception symbol accordingly. It should be noted that receiving may comprise associating a received transmission on the request reception symbol (and/or associated time/frequency resource) with a scheduling request message and/or the first radio node (or UE). Receiving may generally comprise listening for a scheduling request message at reception symbols corresponding to symbols available for transmission. Scheduling a first radio node or UE may comprise configuring it with scheduled resources, e.g. for data signaling, which may be on a data channel like a shared channel, e.g. PUSCH or PSSCH, or on a dedicated channel, which may for example be a low-latency channel.

A network node arrangement may comprise one or more radio nodes, in particular network nodes, which may be of the same or different types. Different nodes of the arrangement may be adapted for, and/or provide, different functionalities described herein. A network node arrangement may in some variants represent a radio access network, and/or a heterogenous network (HetNet), and/or provide dual (or multiple) connectivity, e.g. comprising an anchor node and a booster node, and/or one or more of each or either. The radio nodes of a node arrangement may comprise suitable interfaces for communication between them, e.g. communication interfaces and/or corresponding circuitry.

A system comprising a plurality of radio nodes as described herein, in particular a network node and one or more user equipments, may be considered.

Signaling or a transmission may be considered to carry a message and/or information, if the message and/or information is represented in the (modulated) waveform of the signaling. In particular, extraction of a message and/or information may require demodulation and/or decoding of the signaling. Information may be considered to be included in a message if the message comprises a value and/or parameter and/or bit field and/or indication or indicator representing the information, or more than one or a combination thereof. Information included in such a message may be considered to be carried by the signaling carrying the message, and vice versa.

The approaches described herein allow efficient configuring of resources for scheduling request, in particular for short periodicities, e.g. below slot duration. The first radio node or UE may determine the available symbols in a slot based on only one resource/reference symbol being configured (e.g., with corresponding signaling), limiting signaling overhead.

The reference symbol may generally be configured directly, e.g. with indicating the symbol with an indicator, or indirectly, e.g. referring to a resource set, and/or table, and/or time/frequency resource.

BRIEF DESCRIPTION OF THE DRAWINGS

The drawings are provided to illustrate concepts and approaches described herein, and are not intended to limit their scope. The drawings comprise.

DETAILED DESCRIPTION

In the following, approaches are described for illustrative purposes in the context of NR RAT. However, they are generally applicable with other technologies. Also, communication in uplink and downlink between a signaling radio node like a network node and a radio node like a UE is described by way of example. The approaches should not be construed to be limited to such communication, but can also be applied for sidelink or backhaul or relay communication. For ease of reference, in some cases it is referred to a channel to represent signaling or transmission on the channel. A PUSCH may represent uplink data signaling, a PDSCH downlink data signaling, a PDCCH downlink control signaling (in particular, one or more DCI messages like scheduling assignments or grants), a PUCCH uplink control signaling, in particular signaling of UCI. A scheduling request message may in some cases be a message only carrying, as payload or information, a scheduling request (e.g., 1 bit), or at most one additional bit. However, in some cases, the message may also comprise additional payload, e.g. additional control information, e.g. feedback information (for example, HARQ acknowledgement information like ACK/NACK) and/or measurement reporting information, e.g. channel state information and/or beamforming information. In addition to bits representing payload information, the message may comprise error coding bits.

Figure 1:
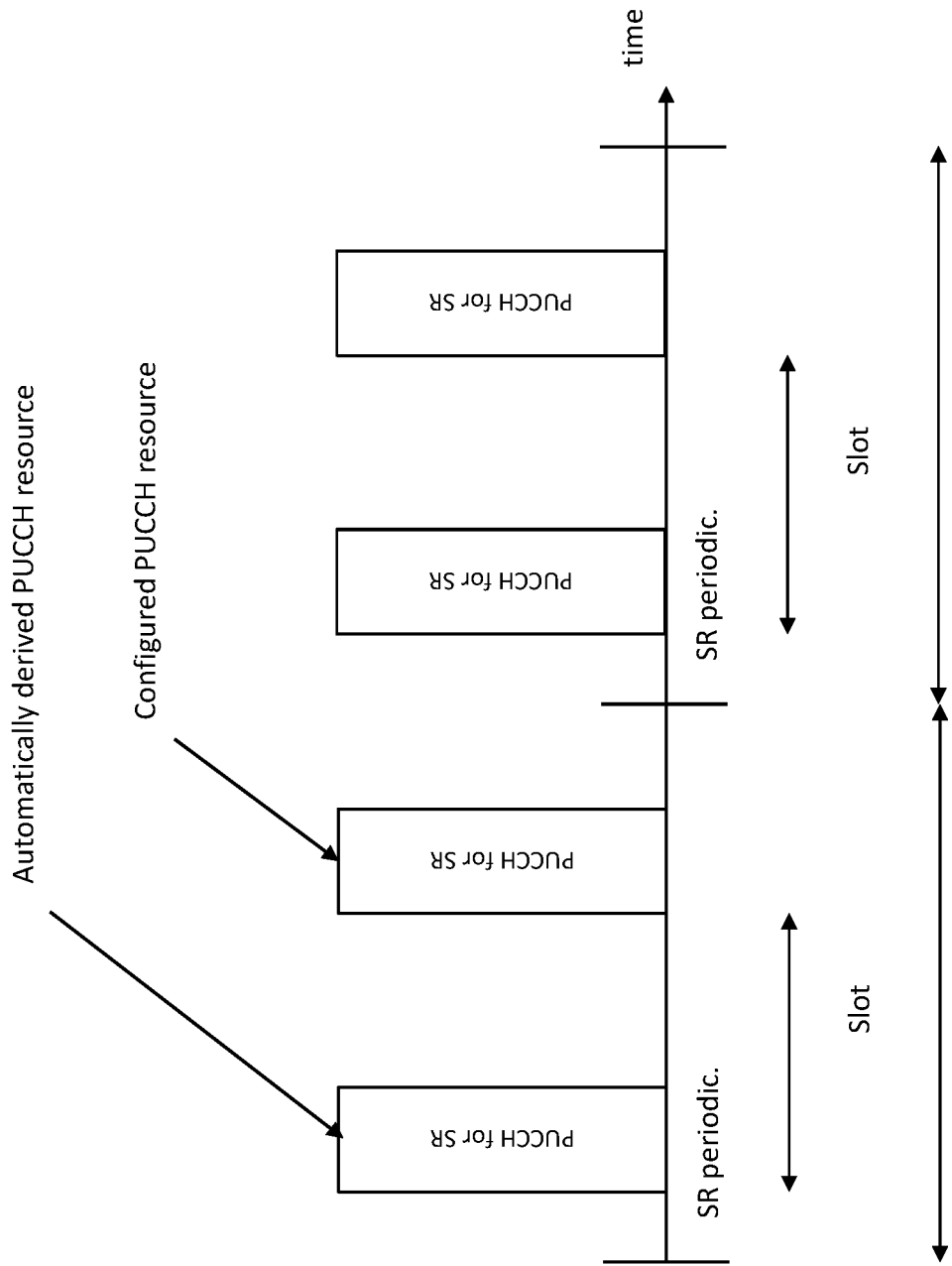
FIG. 1, showing symbols available for scheduling requests.

FIG. 1 shows configuration for scheduling requests. Several consecutive slots are shown, each of which has a slot duration based on a number of symbols in the slot, e.g. 14, or 12, or a different number (for NR, it may be 14). For each slot, there is configured a reference time resource for a scheduling request (SR), which is referred to as configured PUCCH resource for SR. This may be configured with RRC signaling and/or semi-statically. A reference symbol R is associated to this resource and configured implicitly or explicitly with the resource. It should be noted that the resource may extend over more than one symbol in time. There is also configured a periodicity P for scheduling requests SR, which corresponds to a period shorter than the slot duration, e.g. to a number of symbols fewer than the symbols of the slot. The other available symbols (and/or associated resources or symbol ranges) in a slot may be determined, e.g. automatically, by the UE or network node (for reception or scheduling). It may be considered that a PUCCH resource configured for SR has starting symbol $S_{SR}$ within a slot, which may be the reference symbol. The SR periodicity may be $P=L_{SR}$, with $L_{SR}$ for example 2 or 7 symbols, or another value, in particular between 2 and 7. In total, per slot, the following PUCCH resources for SR are defined with start positions $S_{SR,n}=S_{SR,0}+n \cdot L_{SR}$, with $S_{SR,0}=\mod(S_{SR},L_{SR})$ and $n=0, 1, \ldots L/L_{SR}-1$ with L the slot length in symbols. For the starting slot, it may be configured or configurable, or predetermined, whether any start positions (corresponding to available symbols) earlier than the reference symbol are available.

The resource/s associated to an available symbol may in general be associated to control signaling and/or a control channel, in particular a physical control channel like PUCCH or PSCCH, and/or may be associated to control information in general (e.g., UCI and/or SCI), or to scheduling request specifically. A format for transmission may be configured to the resource and/or scheduling request, e.g. a format that has a payload size or 1 or 2 bits, like format 0 or 1 (or derivates thereof).

Figure 2:
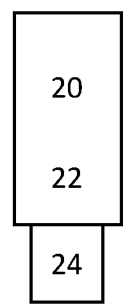
FIG. 2, showing an exemplary radio node implemented as a user equipment.

FIG. 2 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node may generally be adapted to carry out any of the methods of operating a radio node like terminal or UE disclosed herein; in particular, it may comprise corresponding circuitry, e.g. processing circuitry, and/or modules.

Figure 3:
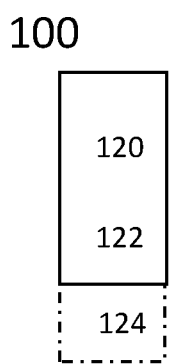
FIG. 3, showing an exemplary radio node implemented as a network node.

FIG. 3 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots. A mini-slot may be considered to correspond to a specific form of scheduling or signaling or transmission, which may be referred to as non-slot based or Type B (in NR), which may be seen as distinct to signaling scheduled for a whole slot and/or with respect to a slot-based structure.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilizing and/or via such intermediate system/s. Providing information may be for radio transmission and/or for transmission via an air interface and/or utilizing a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, and/or indicate quality of service and/or latency and/or data throughput and/or prioritization, in particular they may indicate a capability to provide such, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or one or more data channel/s. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths. For one carrier, more than one numerology may be defined and/or configured. A numerology may be parametrized by a subcarrier spacing and/or a bandwidth and/or a frequency reference. The bandwidth may represent the frequency range of the carrier to be used for the numerology. The frequency reference may identify where on the carrier the bandwidth is located. The frequency reference may correspond to a border frequency of the bandwidth, e.g. low or high frequency border, and/or may represent a center frequency of a subcarrier. The subcarrier may be a reference subcarrier, in particular a border subcarrier. For example, the subcarrier may be the lowest subcarrier (e.g., in frequency and/or number) in a physical resource block of the numerology, e.g. the physical resource block at a start/low end of the bandwidth (in frequency). In some cases, the subcarrier may be the highest subcarrier (in frequency and/or number) of the physical resource block at the end/high end of the bandwidth (in frequency).

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilizing an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms wireless device, user equipment (UE) and terminal may be considered to be interchangeable in the context of this disclosure. A wireless device, user equipment or terminal may represent an end device for communication utilizing the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

Contention-based and/or grant-free transmission and/or access may be based on resource/s that are not specifically scheduled or reserved for the transmission or a specific device (or group of devices in some cases), and/or comprise transmission that is not unambiguously associatable, by the receiver, with a transmitter, e.g. based on the resources used for transmission.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A resource pool generally may indicate and/or comprise resources, in particular time-frequency resources, e.g. time and frequency intervals, which may be contiguous or interrupted, and/or code resources. A resource pool may in particular indicate and/or comprise resource elements and/or resource blocks, e.g. PRBs. A radio node like a user equipment may be considered to be configured with a resource pool if it received corresponding control signaling configuring it therewith. Such control signaling may in particular be transmitted by a receiving radio node as described herein. The control signaling may in particular be higher layer signaling, e.g. MAC and/or RRC signaling, and/or may be semi-static or semi-persistent. In some cases, the responding radio node or user equipment may be considered configured with a resource pool, if it is informed about a corresponding configuration, e.g. that it may access resources in the pool for transmitting. Such a configuration in some cases may be predefined, e.g. based on a standard and/or default configuration. A resource pool may be dedicated to one responding radio node or user equipment, or in some cases shared between several. It may be considered that a resource pool may be general, or for specific types of signaling, e.g. control signaling or data signaling. A transmission resource pool may in particular be for control signaling, e.g. uplink control signaling and/or sidelink control signaling, and/or may be dedicated to the user equipment/responding radio node. It may be considered that a resource pool comprises a plurality of resource structures, which may be arranged in subpools or groups, e.g. pertaining and/or according to type of (received or scheduled) signaling or type of response control signaling. Each group or subpool may comprise a number of resource structures, wherein the number may be representable by an indicator and/or bit field of the selection control information. For example, the maximum number of resource structures in a group may correspond to the maximum number of different values representable by the bit field or indicator. Different groups may have different numbers of resource structures. It may generally be considered that a group comprises a smaller number of resource structures than representable by the indicator or bit field. A resource pool may represent a search space and/or space of availability of resources and/or resource structures available for specific signaling. In particular, a transmission resource pool may be considered to represent a (time/frequency and/or code) domain or space of resources available for response control signaling.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilize, and/or be adapted to utilize, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN).

It may be considered that a bandwidth part comprises one or more resource blocks or resource block groups, in particular one or more PRBs or PRB groups. A bandwidth part may pertain to, and/or comprise, one or more carriers. A resource pool or region or set may generally comprise one or a plurality (in particular, two or a multiple of two larger than two) of resources or resource structures. A resource or resource structure may comprise one or more resource elements (in particular, two or a multiple of two larger than two), or one or more PRBs or PRB groups (in particular, two or a multiple of two larger than two), which may be continuous in frequency. A Control CHannel Element (CCE) may be considered an example of a resource structure, in particular for control signaling, e.g. DCI or SCI.

A carrier may generally represent a frequency range or band and/or pertain to a central or center frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilizing microwave and/or millimeter and/or other frequencies, in particular between 100 MHz or 1 GHz, and 100 GHz or 20 or 10 GHz. Such communication may utilize one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilize TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilizing a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilizing the sidelink for communication (respectively, for signaling). Sidelink transmission and/or transmitting on a sidelink may be considered to comprise transmission utilizing the sidelink, e.g. associated resources and/or transmission formats and/or circuitry and/or the air interface. Sidelink reception and/or receiving on a sidelink may be considered to comprise reception utilizing the sidelink, e.g. associated resources and/or transmission formats and/or circuitry and/or the air interface. Sidelink control information (e.g., SCI) may generally be considered to comprise control information transmitted utilizing a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically. In general, a configuration, in particular the feedback configuration and/or a codebook configuration or a set thereof, may be configured based on one or more messages. Such messages may be associated to different layers, and/or there may be at least one message for dynamical configuration and/or at least one message for semi-static configuration. Different messages may configure different or similar or the same parameter/s and/or setting/s; in some cases, dynamic configuration, e.g. with DCI/SCI signaling, may override semi-static configuration, and/or may indicate a selection from a set of configurations, which may e.g. be pre-defined and/or configured with higher layer/semi-static configuration. In particular, a configuration like a feedback configuration may be configured with one or more Radio Resource Control (RRC) messages and/or one or more Medium Access Control (MAC) messages and/or one or more Control Information messages, e.g. Downlink Control Information (DCI) messages and/or Sidelink Control Information (SCI) messages.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronization structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Control information may generally be transmitted in a control message, e.g. on a physical layer or channel, e.g. as a dynamic message like a DCI message or SCI message, or in some case as higher-layer signaling, e.g. RRC or MAC layer signaling. A control message may be a command type message, which may comprise, and/or consist of, command type information; or a scheduling type message, which may comprise scheduling information, e.g. scheduling data signaling. Control information may comprise scheduling type control information (or, shorter, scheduling type information), e.g. control information indicating resources and/or transmission parameters for reception of signaling, and/or control information indicating resources and/or transmission parameters for transmission of signaling. The signaling may in particular be data signaling, e.g. on a data channel. Control information may in particular comprise, or consist of, command type control information, and/or be included into a command type message. In general, control information or control message, e.g. DCI or SCI messages, may be distinguished between scheduling type information/messages and command type information/messages. A scheduling type message may schedule transmission on a data channel (data signaling), e.g. for reception or transmission for the target radio node, e.g. in downlink or uplink, respectively. Scheduling grant and scheduling assignment are examples of such scheduling type messages. A command type message may be a message of a different type, e.g., not scheduling transmission on a data channel. A command type message may comprise a set of instructions, which may be configurable or flexible. The instructions may be scheduling-independent. Command type information may for example indicate and/or instruct switching of bandwidth, e.g. to another bandwidth part, and/or activation or deactivation of a carrier and/or cell and/or bandwidth part, and/or activation or deactivation of grant-free transmissions, and/or indications of selection a parameter or configuration out of a set of configured parameters or configurations. In some variants, a command type message may be scheduling independent such that it does not schedule data signaling, or it may have a structure in which such scheduling may be configurable or optional. For the command type, there may be no scheduled transmission based on which reception of the control information may be inferred. It should be noted that scheduling type messages may comprise command type information. Feedback information may be considered a form of control information, in particular UCI or SCI, depending on communication direction or mode. Feedback signaling may be considered a form of control signaling. A control message comprising feedback information may be considered to be of a further type, which may be referred to as feedback type message, which may include a request for resources or in general UCI or UCI-like information in sidelink or backhaul or relay link.

Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbors at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, if transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

Operational conditions may pertain to load of the RAN, or application or use case of transmission or signaling, and/or quality of service (QoS) conditions (or requirements) for a transmission or signaling. QoS may for example pertain to data rate and/or priority and/or latency and/or transmission quality, e.g. BLER or BER. Use for URLLC may be considered a quality of service-related condition.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or a general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
|---|---|
| ACK/NACK | Acknowledgment/Negative Acknowledgement |
| ARQ | Automatic Repeat reQuest |
| CAZAC | Constant Amplitude Zero Cross Correlation |
| CBG | Code Block Group |
| CCE | Control Channel Element |
| CDM | Code Division Multiplex |
| CM | Cubic Metric |
| CORESET | Control channel Resource Set |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DM(-)RS | Demodulation reference signal(ing) |
| FDD/FDM | Frequency Division Duplex/Multiplex |
| HARQ | Hybrid Automatic Repeat Request |
| IFFT | Inverse Fast Fourier Transform |
| MBB | Mobile Broadband |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OFDM/A | Orthogonal Frequency Division Multiplex/Multiple Access |
| PAPR | Peak to Average Power Ratio |
| PBCH | Physical Broadcast CHannel |
| PDCCH | Physical Downlink Control CHannel |
| PDSCH | Physical Downlink Shared CHannel |
| PRACH | Physical Random Access CHannel |
| PRB | Physical Resource Block |
| PUCCH | Physical Uplink Control CHannel |
| PUSCH | Physical Uplink Shared CHannel |
| (P)SCCH | (Physical) Sidelink Control CHannel |
| (P)SSCH | (Physical) Sidelink Shared CHannel |
| QoS | Quality of Service |
| RB | Resource Block |
| RNTI | Radio Network Temporary Identifier |
| RRC | Radio Resource Control |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SVD | Singular-value decomposition |
| TDD/TDM | Time Division Duplex/Multiplex |
| UCI | Uplink Control Information |
| UE | User Equipment |
| URLLC | Ultra Low Latency High Reliability Communication |
| VL-MIMO | Very-large multiple-input-multiple-output |
| ZF | Zero Forcing |

Abbreviations may be considered to follow 3GPP usage if applicable.

What is claimed is:

1. A method of operating a user equipment in a radio access network, the method comprising:
    configuring a reference time resource available in at least one slot, for transmission of a scheduling request by the user equipment, the reference time resource comprising a reference symbol R, each of the at least one slot having a slot duration that is based on a number N of symbols in a slot, the user equipment being further configured with a requesting periodicity P of 7 symbols, the requesting periodicity indicating a periodicity with a time period shorter than the slot duration; and
    transmitting a scheduling request message at a request transmission symbol T which is based on the reference symbol R and the periodicity P of 7 symbols.

2. A user equipment for a radio access network, the user equipment comprising:
    processing circuitry configured with:
        a reference time resource available in at least one slot, for transmission of a scheduling request by the user equipment, the reference time resource comprising a reference symbol R, each of the at least one slot having a slot duration that is based on a number N of symbols in a slot;
        a requesting periodicity P of 7 symbols, the requesting periodicity indicating a periodicity with a time period shorter than the slot duration; and
    a transmitter configured:
        for transmitting a scheduling request message at a request transmission symbol T which is based on the reference symbol R and the periodicity P of 7 symbols.

3. The user equipment according to claim 2, wherein at least one of:
    the scheduling request message is transmitted over at least one symbol; and
    the reference time resource comprises at least one symbol.

4. The user equipment according to claim 2, wherein the scheduling request message is a physical control channel message.

5. The user equipment according to claim 2, wherein at least one of:
    at least one of the periodicity P and the reference symbol R is semi-statically configured; and
    at least one of the periodicity P and the reference symbol R is configured utilising Radio Resource Control signaling.

6. The user equipment according to claim 2, wherein the periodicity P and the reference symbol R are configured with the same message or with different messages.

7. The user equipment according to claim 2, wherein the request transmission symbol T is earlier in a slot than the reference symbol R of the same slot.

8. The user equipment according to claim 2, wherein the processing circuitry is configured with a slot offset, the slot offset indicating a starting slot from which the reference time resource is available.

9. The user equipment according to claim 2, wherein the scheduling request message comprises one of 1 and 2 bits.

10. The user equipment according to claim 2, wherein 1 bit of the scheduling request message indicates whether the user equipment requests resources for transmission by the user equipment.

11. A method of operating a radio node in a radio access network, the method comprising:
- configuring a user equipment with a reference time resource available in at least one slot for transmission of a scheduling request by the user equipment, the reference time resource comprising a reference symbol R, each of the at least one slot having a slot duration that is based on a number N of symbols in a slot, the user equipment also being configured with a requesting periodicity P of 7 symbols, the requesting periodicity indicating a periodicity with a time period shorter than the slot duration; and
- receiving a scheduling request message at a request reception symbol RC which is based on the reference symbol R and the periodicity P of 7 symbols.

12. A radio node for a radio access network, the radio node comprising:
- processing circuitry configured to:
  - configure a user equipment with a reference time resource available in at least one slot for transmission of a scheduling request by the user equipment, the reference time resource comprising a reference symbol R, each of the at least one slot having a slot duration that is based on a number N of symbols in a slot, the user equipment also being configured with a requesting periodicity P of 7 symbols, the requesting periodicity indicating a periodicity with a time period shorter than the slot duration; and
  - receive a scheduling request message at a request reception symbol RC which is based on the reference symbol R and the periodicity P of 7 symbols.

13. The radio node according to claim 12, wherein at least one of:
- the scheduling request message is transmitted over at least one symbol; and
- the reference time resource comprises at least one symbol.

14. The radio node according to claim 12, wherein the scheduling request message is a physical control channel message.

15. The radio node according to claim 12, wherein at least one of:
- at least one of the periodicity P and the reference symbol R is semi-statically configured; and
- at least one of the periodicity P and the reference symbol R is configured utilising Radio Resource Control signaling.

16. The radio node according to claim 12, wherein the periodicity P and the reference symbol R are configured with the same message or with different messages.

17. The radio node according to claim 12, wherein the request transmission symbol T is earlier in a slot than the reference symbol R of the same slot.

18. The radio node according to claim 12, wherein the user equipment is configured with a slot offset, the slot offset indicating a starting slot from which the reference time resource is available.

19. The radio node according to claim 12, wherein the scheduling request message comprises one of 1 and 2 bits.

20. The radio node according to claim 12, wherein 1 bit of the scheduling request message indicates whether the user equipment requests resources for transmission by the user equipment.

21. A non-transitory computer storage medium storing an executable computer program that, when executed, causes processing circuitry to at least one of control and perform a method of operating a user equipment in a radio access network, the method comprising:
- configuring with a reference time resource available in at least one slot, for transmission of a scheduling request by the user equipment, the reference time resource comprising a reference symbol R, each of the at least one slot having a slot duration that is based on a number N of symbols in a slot, the user equipment being further configured with a requesting periodicity P of 7 symbols, the requesting periodicity indicating a periodicity with a time period shorter than the slot duration; and
- transmitting a scheduling request message at a request transmission symbol T which is based on the reference symbol R and the periodicity P of 7 symbols.

22. A non-transitory computer storage medium storing an executable computer program that, when executed, causes processing circuitry to at least one of control and perform a method of operating a radio node in a radio access network, the method comprising:
- configuring a user equipment with a reference time resource available in at least one slot for transmission of a scheduling request by the user equipment, the reference time resource comprising a reference symbol R, each of the at least one slot having a slot duration that is based on a number N of symbols in a slot, the user equipment also being configured with a requesting periodicity P of 7 symbols, the requesting periodicity indicating a periodicity with a time period shorter than the slot duration; and
- receiving a scheduling request message at a request reception symbol RC which is based on the reference symbol R and the periodicity P of 7 symbols.

* * * * *